Jan. 25, 1955  M. HEYMERING ET AL  2,700,167
AUTOMATIC METAL FORMING MACHINE
Filed May 16, 1951  7 Sheets-Sheet 1

INVENTORS
MARINUS HEYMERING
CECIL W. HOPKINS
BY *Strauch, Nolan & Diggins*
ATTORNEYS

United States Patent Office 2,700,167
Patented Jan. 25, 1955

2,700,167

AUTOMATIC METAL FORMING MACHINE

Marinus Heymering and Cecil W. Hopkins, Waynesboro, Pa., assignors to Landis Machine Company, Waynesboro, Pa., a corporation of Pennsylvania Application May 16, 1951, Serial No. 226,696

19 Claims. (Cl. 10—91)

This invention relates to metal forming machines for automatically and sequentially accomplishing forming operations on the opposite ends of a work piece. The invention further relates to mechanisms for automatically performing secondary machining operations upon work pieces which previous machining operations, especially threading, have rendered difficult to hold in a stationary position.

More specifically, the present invention is primarily concerned with improvements in machines of the type disclosed in United States Patent No. 2,360,906 issued October 24, 1944 to Smith. This patent discloses a metal forming machine having two work forming stages for threading the opposite ends of pipe nipples, each stage comprising a rotatable die head and movable grips for non-rotatably holding a work piece and advancing it into and out of the die heads. In a machine of this type, the accuracy of the thread cutting operation depends upon the rigidity and accuracy with which the work piece is held as it is advanced into the rotatable die heads. In the above mentioned machine the necessary rigid gripping of the work piece in the second stage is effected by unthreaded grips which seize the work piece on an unthreaded portion thereof. Such a machine therefore is limited to the production of nipples or other parts having an unthreaded portion between the two threaded ends to provide a surface for gripping the part in the second operation.

However a large proportion of pipe nipples produced commercially are necessarily made in lengths so short that there is no unthreaded portion between the threaded ends to provide the necessary gripping surface in the second stage of the operations. Such nipples, which are completely threaded, are known as "close" nipples. Also important commercially are those nipples having a very short unthreaded portion between the two threaded ends known as "short" nipples. Because of the necessarily large gripping force employed to assure the rigidity of the work piece, the conventional unthreaded grips employed in the above mentioned patent cannot be utilized to hold such nipples during the second stage of the operation without destroying the threads formed in the first stage.

Prior attempts to produce a continuous thread on work pieces, such as close and short nipples, have met with no practical success due to the opposite inclination of the taper of the threads. It is, therefore, generally recognized that close and short nipples are more accurately and efficiently produced by separately threading each end of a blank cut to proper nipple length, that is, by starting to thread from each end and proceeding toward the center of the nipple.

It will be seen, therefore, that short and close nipples must be held for the second threading operation by grips engaging the threaded portion produced by the first threading operation. Prior to our invention, hand operated thread cutting machines were employed for this purpose and the partially formed work piece was inserted manually in the threaded grips of the machine for the second threading operation.

Despite the desirability of adapting a machine of the type disclosed in the above mentioned patent for automatically gripping in the second stage the threads formed in the first stage, prior to the present invention, all efforts to achieve this result have been unsuccessful because of the difficulty of registering the threads of a second grip with the threads of the partially formed work piece, which is, of course, absolutely essential to avoid destruction of the threads.

As the first effective solution of this problem, the present invention contemplates an improved two stage thread cutting machine of the type disclosed in the above mentioned patent, the first stage of which threads one end of a nipple blank. The partially threaded nipple is then transferred to the second stage and reversed end for end where it is automatically inserted into threaded grips, gripped, threaded and discharged from the machine all without injury to the previously formed threads. The elimination of manual operation, which is effected for the first time by the present invention, without possibility of damage to the partially threaded nipple results in substantially increased production and savings in labor costs without sacrificing accuracy of the product.

Accordingly it is an important object of the invention to provide a thread-cutting machine for automatically threading close and short nipples.

It is a further object of the invention to provide a two-stage thread-cutting machine having a transfer mechanism to transfer work pieces from the first stage to the second while reversing them end for end and mechanism associated with the second stage for automatically seizing the partially completed work pieces on the threaded portion thereof and holding them in position for the second threading operation.

It is another object of the invention to provide mechanism to bring the threads of the partially completed work piece into register with the threaded grips of the second stage.

It is a further object to provide mechanism to remove the partially completed work piece from the threaded grips without damage to the threads of the work piece or the grips.

It is a still further object to provide a two-stage thread-cutting machine for objects of the nature of close or short pipe nipples, having mechanisms for locating, gripping, threading and ejecting the nipples, all these mechanisms operating in positively timed relation to each other.

Other objects and advantages will be apparent from the following description of our invention and the annexed drawings in which.

Figure 1:
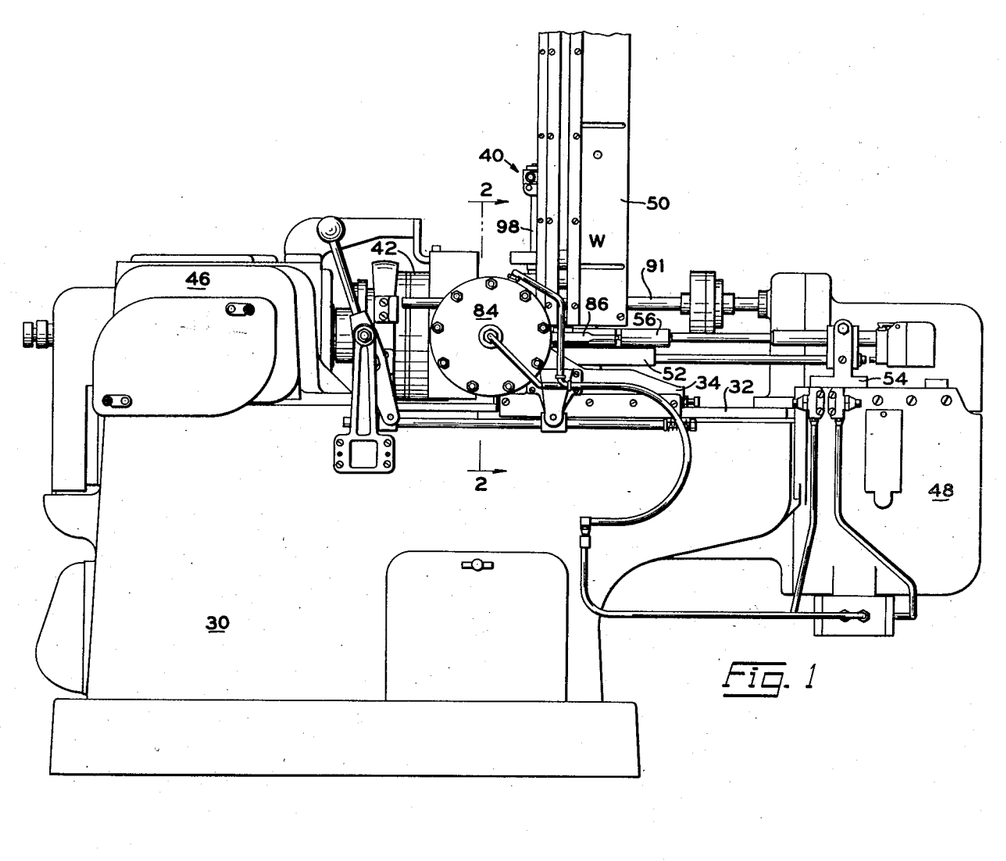
Figure 1 is a side elevational view of a two-stage threading machine taken from the first-stage side thereof.
Figures 2A, 4:
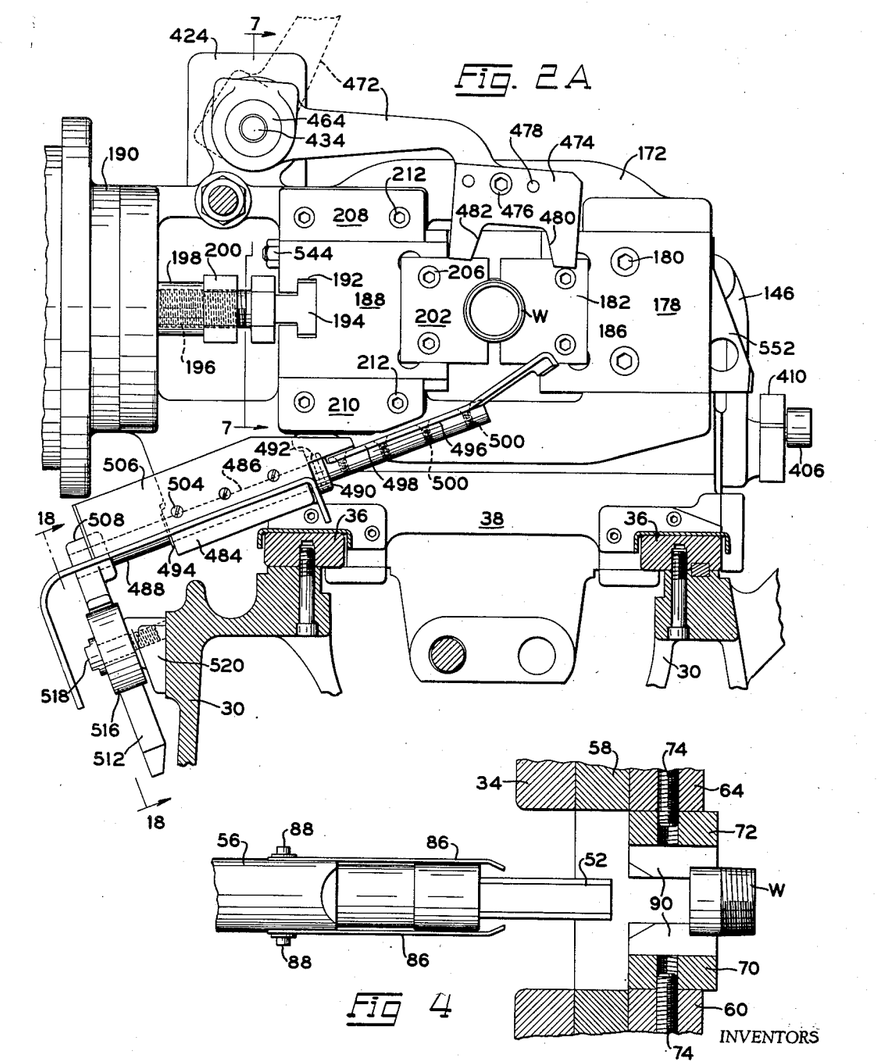
Figures 2A and 2B constitute a partial transverse sectional view of the machine taken along line 2—2 of Figure 1.
Figure 4 is a horizontal sectional view taken along line 4—4 of Figure 2B.
Figure 2B:
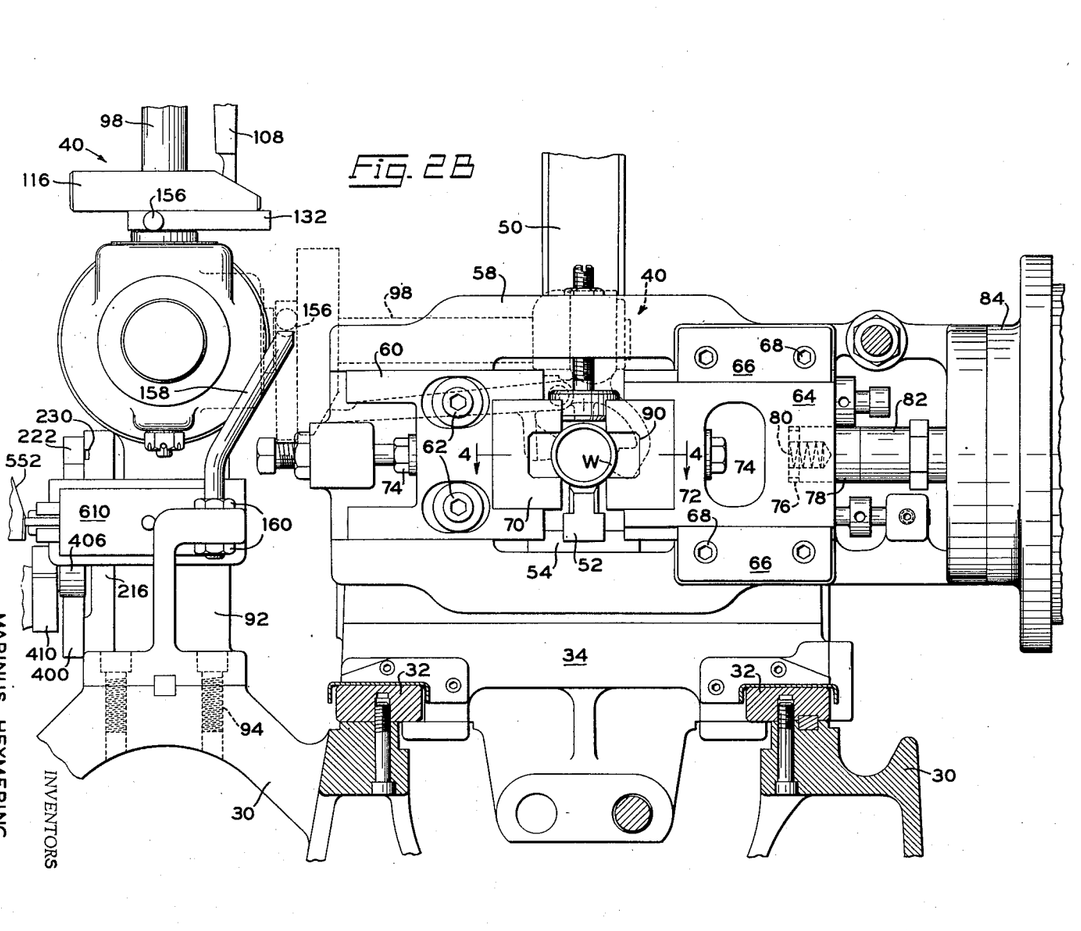

In Figure 1 in elevation and in Figures 2A and 2B in section, is shown as an illustrative embodiment of our invention, a two-stage thread-cutting machine of the same general type as that shown and described in the above-mentioned patent to Smith. The bed 30 of the machine has, suitably secured to the top surfaces thereof, ways 32 which support, in well known manner, a carriage 34 for reciprocal sliding movement in a direction longitudinally of the machine. Carriage 34 and its attached parts constitute the work holding and feeding mechanism of the first stage of the machine, wherein the first end of the blank work piece is operated upon.

The bed 30 also supports, on ways 36 (Figure 2A), a second carriage 38 which is laterally spaced from the first carriage 34 and which, with the parts attached thereto, constitutes the work holding and feeding mechanism of the second stage of the machine. In this stage, the partially finished work piece is automatically completed and dropped from the machine. On the bed 30 and between the carriages 34 and 38 a transfer mechanism, generally indicated by the reference character 40 (Figures 2B and 3) is mounted to transfer the partially completed work piece from the carriage 34 to the carriage 38, meanwhile reversing it end-for-end.

A pair of die heads, 42 (Figure 1) and 44 (Figure 3), are mounted in operative longitudinal alignment with carriages 34 and 38, respectively. These die heads 42 and 44 are conventionally supported by a headstock 46, which in turn rests upon the bed 30. The carriages 34 and 38 are moved alternately toward and from the die heads 42 and 44 by their connection with a main cam (not shown) contained in a housing 48 at the end of the machine opposite to that on which the headstock 46 is mounted. The details of this phase of the operation of the machine are fully set forth in the above patent to Smith and therefore need not be further described.

Work pieces W enter the machine by being placed manually in a gravity-feed magazine 50 (Figure 1) which is secured in upright position on the first-stage carriage 34. A work holder 52 is positioned directly below the opening of the magazine 50 to receive the work pieces discharged therefrom and is maintained in stationary relation to the bed of the machine by a bracket 54, which, in turn, is mounted on the cam housing 48. A stationary plunnger 56 is also supported by the bracket 54 and is disposed above the work holder 52. Thus, in the rearward movement of carriage 34, a work piece resting on work holder 52 will be held stationary relative to the bed 30 of the machine by plunger 56.

On its end facing die head 42, the carriage 34 supports a carriage front 58 (Figure 2B) in the usual manner. A stationary vise jaw 60 is secured to one side of carriage front 58 by screws 62. A second vise jaw 64 is mounted on carriage front 58 for sliding movement toward and from the center thereof and is maintained in position by means of a pair of gibs 66 which are secured to carriage front 58 by screws 68. The opposed, inwardly facing sides of vise jaws 60 and 64 are recessed to receive a pair of grips 70 and 72, respectively, which are retained in position by screws 74 (Figures 2B and 4).

The surface of vise jaw 64 opposite to that in which grip 72 is mounted is provided with a cylindrical recess 76 to receive a hollow cylinder 78. A spring 80, in compresession between the bottom of recess 76 and the interior of cylinder 78, urges cylinder 78 outwardly of recess 76. However, any movement of cylinder 78 in this direction is prevented by a member 82 which abuts cylinder 78 and is connected at one end to the piston rod of a pneumatic cylinder 84. Cylinder 84 is secured to the outer side of carriage front 58 and is thus capable of applying pressure toward the center of the carriage front, compressing the spring 80 until cylinder 78 is in contact with the bottom of recess 76 and thereafter causing the grip 72 to close upon a work piece. It will be noted that when air pressure is applied in cylinder 84, in the opposite direction, grip 72 maintains its position but only under the influence of the spring 80, which may be easily overcome by the work piece as it enters or leaves gripping position.

After the machining operation has been performed upon the work piece held by grips 70 and 72, the air pressure against grip 72 is released and the carriage 34 moves rearwardly to bring the partially completed work piece over the forward portion of work holder 52 (Figure 4). Further rearward movement of the carriage brings the work piece held loosely in the grips 70 and 72 into contact with the forward ends of a pair of leaf springs 86 which are secured, by screws 88, on opposite sides of the plunger 56. In the continued movement of carriage 34, springs 86 urge the work piece out of grips 70 and 72 and it drops onto work holder 52 in position to be seized by the transfer mechanism 40. The following work piece is then positioned between the grips 70 and 72 and the air pressure is again applied to grip 72. In the succeeding forward movement of carriage 34, the resilient nature of springs 86 permits the work piece to be drawn forwardly from between the springs. It will be noted (Figures 2B and 4) that grips 70 and 72 are recessed as at 90 to permit the passage of springs 86 therethrough.

Figures 5, 6, 7, 8:
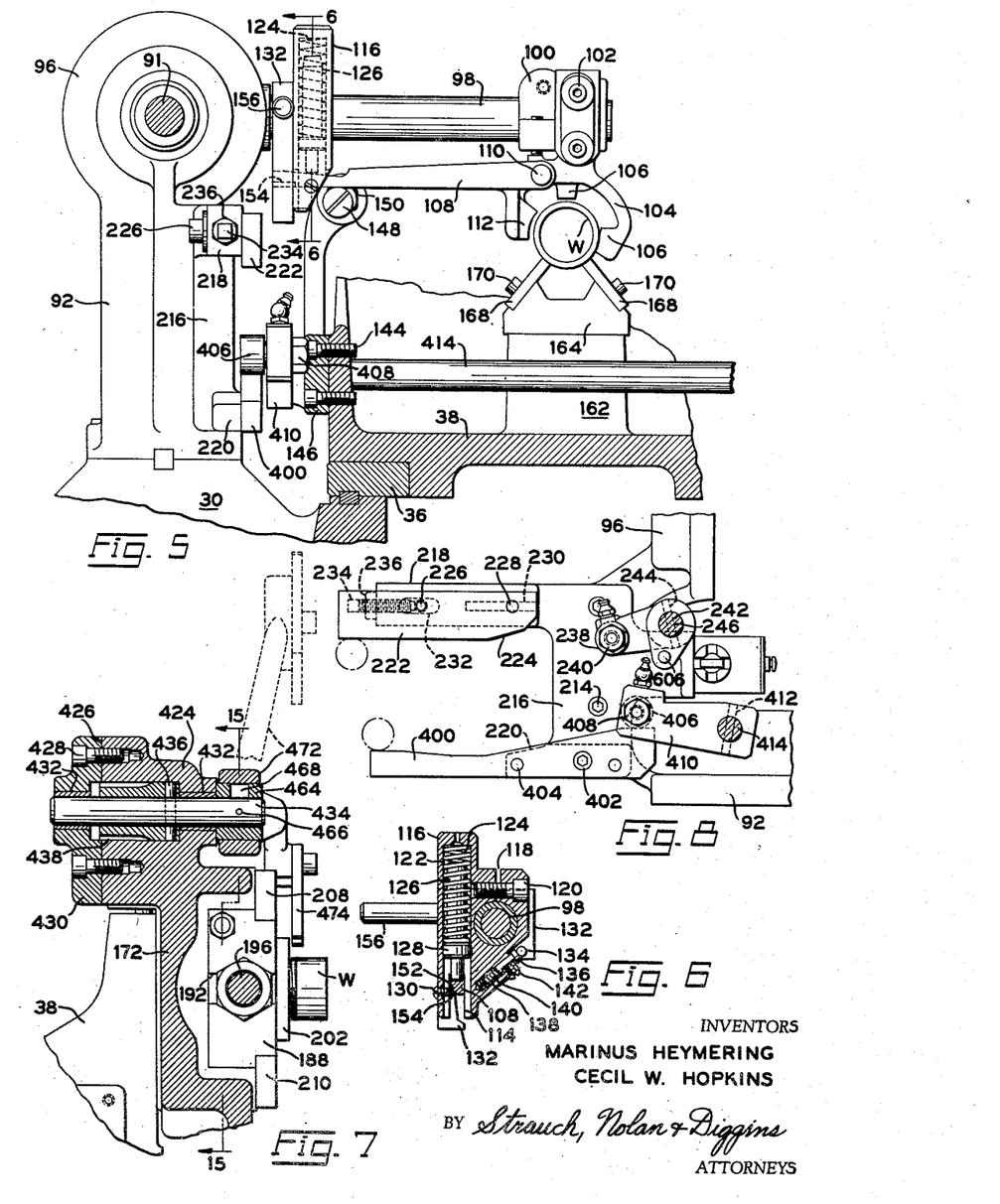
Figure 5 is an elevational view of the transfer mechanism, partially in section, showing the mechanism in position to discharge a work piece to the second stage of the machine.
Figure 6 is a partial sectional view taken along line 6—6 of Figure 5.
Figure 7 is a vertical sectional view taken along line 7—7 of Figure 2A.
Figure 8 is a vertical sectional view taken along lines 8—8 of Figure 3.

The transfer mechanism 40, whose operation is effected and controlled, through shaft 91 (Figures 1 and 5) in generally the same manner as that shown in the Smith patent mentioned above, is shown in detail in Figures 2B, 5 and 6. This mechanism is supported by a bracket 92 secured, by means of screws 94, to a portion of the bed 30 between the two working stages of the machine. As shown in Figure 5, bracket 92 is provided with an upwardly projecting boss 96 which supports the mechanism for transferring a work piece from the first stage to the second while it is being reversed end-for-end. This mechanism includes a transfer arm 98 which projects radially outwardly from boss 96 and on which the transfer fingers are mounted as will be described. The chief difference between the transfer mechanism shown in the Smith patent and that of the present invention is that the gripping fingers of the latter are mechanically operated, while those of the former were operated by fluid motor means. Figure 2B shows the transfer arm 98 in vertically upright position between the two stages of the machine, and in dotted outline, in position to remove a partially finished work piece from the first stage while Figure 5 shows it in the position which it occupies at the moment of delivering a partially formed work piece to the second stage. In Figure 5 a bracket 100 is shown mounted on the outer extremity of transfer arm 98 and is frictionally retained thereon by means to be described later. Attached to bracket 100 by screws 102 is a stationary gripping finger 104 which is curved about an angle of approximately 100° and is provided with spaced pads 106 to engage a work piece at widely separated points.

A gripping lever 108 is pivotally secured, by means of a pin 110 to the stationary gripping finger 104 and is provided with a third pad 112 to cooperate with pads 106 to grip a work piece. Lever 108 extends along transfer arm 98 and through a slot 114 (Figure 6) in bracket member 116. This bracket member is retained on transfer arm 98 in the same manner as bracket 100. That is, bracket member 116 is partially split as at 118, the split portion being joined by a screw 120.

Within bracket member 116 a cylindrical recess 122 is formed to receive a spring 124. Spring 124 surrounds a portion of a plunger 126 and acts against an enlarged portion 128 thereof to urge plunger 126 outwardly. Such outward movement of the plunger is limited by a screw 130 which is threaded in the side of bracket 116 and extends into recess 122 to engage enlarged portion 128 of the plunger. The outer end of plunger 126 engages gripping lever 108 which is thus urged into gripping position.

Inwardly adjacent bracket member 116, a freely rotatable latch member 132 is mounted on transfer arm 98. A pin 134 extends outwardly from member 132 adjacent a side surface of bracket 116 where it is engaged by a plunger 136 which is disposed in a laterally directed recess 138 in bracket 116. A compression spring 140, mounted in the bottom of recess 138 urges plunger 136 outwardly thereof and consequently urges latch member 132 to rotate in the counterclockwise direction as seen in Figure 6. Outward movement of plunger 136 is limited by a screw 142.

Figure 3:
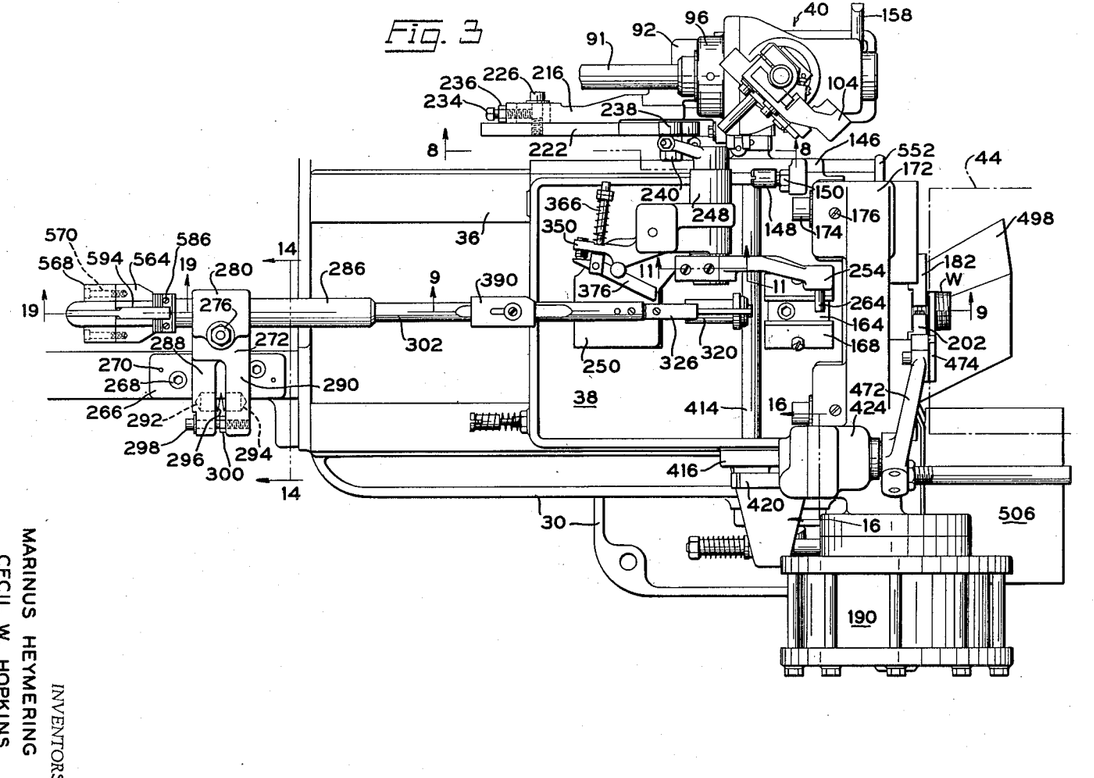
Figure 3 is a partial plan view of the second stage of the machine and the transfer mechanism thereof and showing a work piece being threaded.

As seen in Figures 3 and 5, there is attached to the side of carriage 38, by means of screws 144, a bracket 146, a portion of which extends upwardly from carriage 38 to support an eccentric stud 148. Stud 148 is threaded on one end and is threadly engaged in bracket 146. A lock nut 150 (see Figure 3) is provided to prevent undesired rotation of stud 148.

As the transfer arm 98, and the parts carried thereby, is rotated about the axis of shaft 91 into the position shown in Figure 5, gripping lever 108 contacts the unthreaded portion of stud 148 and is thereby rotated about pivot pin 110 relative to stationary gripping finger 104 causing the work piece to be released as shown, and compressing spring 124.

Since, in the return movement of transfer arm 98 to the first stage of the machine, no work piece is carried, it has been found convenient to maintain gripping lever 108 in the open position during this period. This is accomplished by the provision, on latch member 132, of a latching surface 152. When, as explained above, gripping lever 108 is rocked about pivot pin 110 into open position, a beveled surface 154 on the lever engages the latching surface 152. Gripping lever 108 is then held in this position against the force of spring 124 because of the tendency of latch member 132 to rotate in the counterclockwise direction under the impetus of spring 140. It should be noted that the eccentric relation between the threaded and unthreaded portion of stud 148 renders possible a fine adjustment of the degree of rocking movement of gripping lever 108. A rod 156 (Figure 6) is frictionally fitted in one side of latch member 132 and protrudes laterally thereof. As the return movement of transfer arm 98 to the first stage is completed, rod 156 is carried into contact with the top of a stud 158 (Figure 2B) which is mounted by a pair of lock nuts 160 in a portion of the stationary transfer bracket 92. This contact results in the rocking of latch member 132 in the clockwise direction (as seen in Figure 6) against the force of spring 140. In this manner, the latching surfaces 152 and 154 are separated and gripping lever 108 returns to closed position to seize a work piece as shown in the dotted line position of Figure 2B. It will now be seen that, by use of the above-described mechanism, a work piece after being threaded at one end may be lifted automatically from the first stage of the machine, reversed end for end and deposited in the second stage with its blank or unthreaded end facing the die head 44 as shown in Figure 9.

Figures 9, 10, 11, 12, 13:
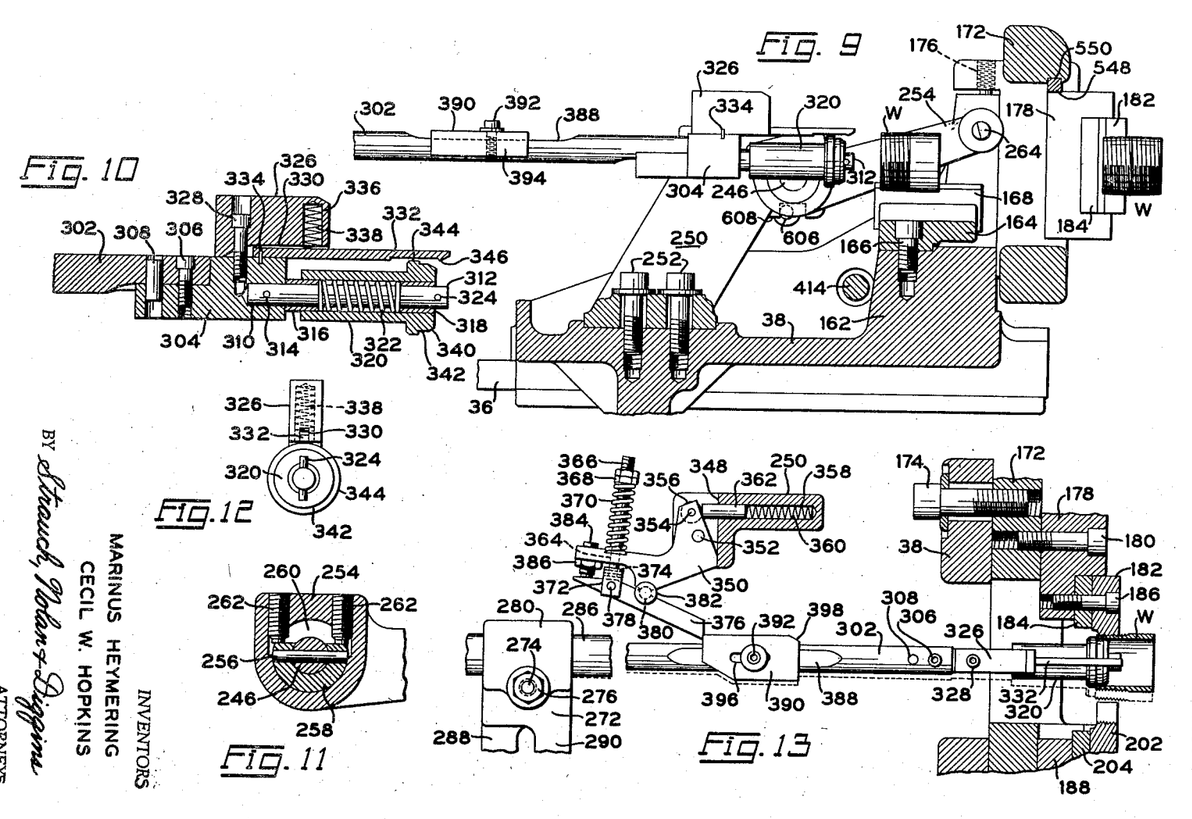
Figure 9 is a vertical sectional view taken along line 9—9 of Figure 3.
Figure 10 is an enlarged vertical sectional view of a portion of Figure 9.
Figure 11 is a detail sectional view taken along line 11—11 of Figure 3.
Figure 12 is an elevational view of the right-hand end of Figure 10.
Figure 13 is a detail plan view, partially in section, of certain of the parts shown in Figure 3, but showing the work piece being placed in position in the grips.

From Figures 5 and 9 it will appear that a platform 162 is formed as an integral part of carriage 38 near the forward end thereof. A work holding base 164 is secured to platform 162 by a screw 166. A pair of work holding blades 168 are secured to the inclined sides of base 164 by screws 170 to form a rest for the partially finished work piece which is deposited thereon by the transfer mechanism. The use of removable blades 168 provides a simple and convenient means of accommodating various diameters of nipples so that their axes will all be at approximately the same horizontal position, which is a necessary condition to the operation of our device, as will later appear.

On its end facing the die head 44, the carriage 38 supports a carriage front 172 (Figures 2A, 7 and 9) which is secured to carriage 38 in the usual manner, that is, by means of cap screws 174 (Figure 13) which pass through and are threadedly engaged in carriage front 172. Set screws 176 (Figures 3 and 9) adjustably support carriage front 172 in the vertical direction.

As best seen in Figures 2A and 13, one side of carriage front 172, preferably the side facing the center of the machine, is provided with a stationary vise jaw 178 which is secured to the forward side of the carriage front 172 by means of screws 180. The forward surface of vise jaw 178 is recessed to accommodate a threaded nipple grip 182. A spacing member 184 may be inserted between vise jaw 178 and grip member 182 to vary the longitudinal position of the grip and thus render it suitable for nipples of different lengths. Screws 186 secure both grip 182 and spacing member 184 to the vise jaw 178.

On the other side of carriage front 172 is mounted a second vise jaw 188 which is movable toward and from vise jaw 178. Such movement is accomplished by a pneumatic or other fluid cylinder 190. The outer surface of vise jaw 188 is formed with a T-slot 192 which is engaged by a T-shaped member 194. A threaded portion 196 of member 194 is engaged in the internally threaded piston rod 198 of pneumatic cylinder 190. A lock nut 200 may be used to secure this threaded engagement.

The inner surface of vise jaw 188 is recessed to receive a threaded nipple grip 202 which is complementary to the grip 182 and the thread in which must be formed as a continuity of the thread in grip 182. Threaded grip 202 together with a spacing member 204, similar to spacing member 184, are secured to vise jaw 188 by screws 206. An upper gib 208 and a lower gib 210 (Figures 2A and 7) are secured to carriage front 172 by screws 212 and overlap a portion of vise jaw 188 to retain the vise jaw in the carriage front and to permit only lateral movement thereof. Thus, by the co-action of threaded grips 182 and 202, work pieces W (Figures 2A and 13) may be alternately gripped on their threaded portion and released according to the operation of cylinder 190.

Secured to one side of transfer bracket 92 (Figures 3, 5 and 8) by screws 214 is a cam bracket 216 having two arms 218 and 220 which extend rearwardly in substantially a parallel relation to the path of travel of carriage 38. A cam 222 having inclined cam surfaces 224 is attached to the upper arm 218 of cam bracket 216 by means of a screw 226. A locating pin 228 is also provided to insure the correct location of cam 222 in the vertical plane, said pin having a flattened end to engage a keyway 230 in the arm 218 of cam bracket 216.

Screw 226 is threaded into cam 222 and passes through an opening 232 in arm 218 of cam bracket 216. This opening 232 is preferably elongated to permit adjustment of screw 226 and, with it, the cam 222 in a horizontal direction. A set screw 234 is threaded into one end of opening 232 to engage screw 226 and maintain it in adjusted position. A lock nut 236 is also preferably provided for set screw 234 to prevent undesired rotation thereof.

Arranged to cooperate with the camming surfaces 224 of cam 222 is a roller cam follower 238 (Figures 3 and 8) which is secured in well known manner by a nut 240 to one arm of a bell crank lever 242. Lever 242 is attached by means of a pin 244 to one end of a shaft 246 which is journalled for rotation in a boss 248 formed as a part of a bracket 250 (Figures 3 and 9). The bracket 250 is mounted on carriage 38 and is secured thereto by screws 252.

Mounted adjacent to boss 248 and on the end of shaft 246 opposite to that to which bell crank lever 242 is attached, is a work locating lever 254. The preferable method of mounting this lever is shown in detail in Figure 11. A pin 256 secures a bushing 258 to the end of shaft 246. The end of lever 254 is fitted over bushing 258 which is formed with a slot 260 to provide flat surfaces for engagement by a pair of set screws 262. As shown, set screws 262 engage bushing 258 on opposite sides of the center thereof and effectively key lever 254 to bushing 258 and hence to shaft 246 for unitary rotation therewith. At the same time this construction provides a convenient means for adjusting the angular position of lever 254 relative to shaft 246, merely by advancing one of the set screws and withdrawing the other.

It will be noted that, as carriage 38 reciprocates toward and from die head 38 under the control of the main cam of the machine, as shown in the Smith patent mentioned above, the roller follower 238 will co-act with the operative surfaces of the relatively stationary cam 222, which is indirectly fixed to the bed 30 of the machine, to rock shaft 246 and with it the lever 254. A pin 264 is frictionally fixed in the end of lever 254 and extends laterally therefrom (Figure 3) to engage the forward end of a work piece W in one position of the lever 254 for a purpose explained below.

Figures 14, 15, 16, 17, 18, 19:
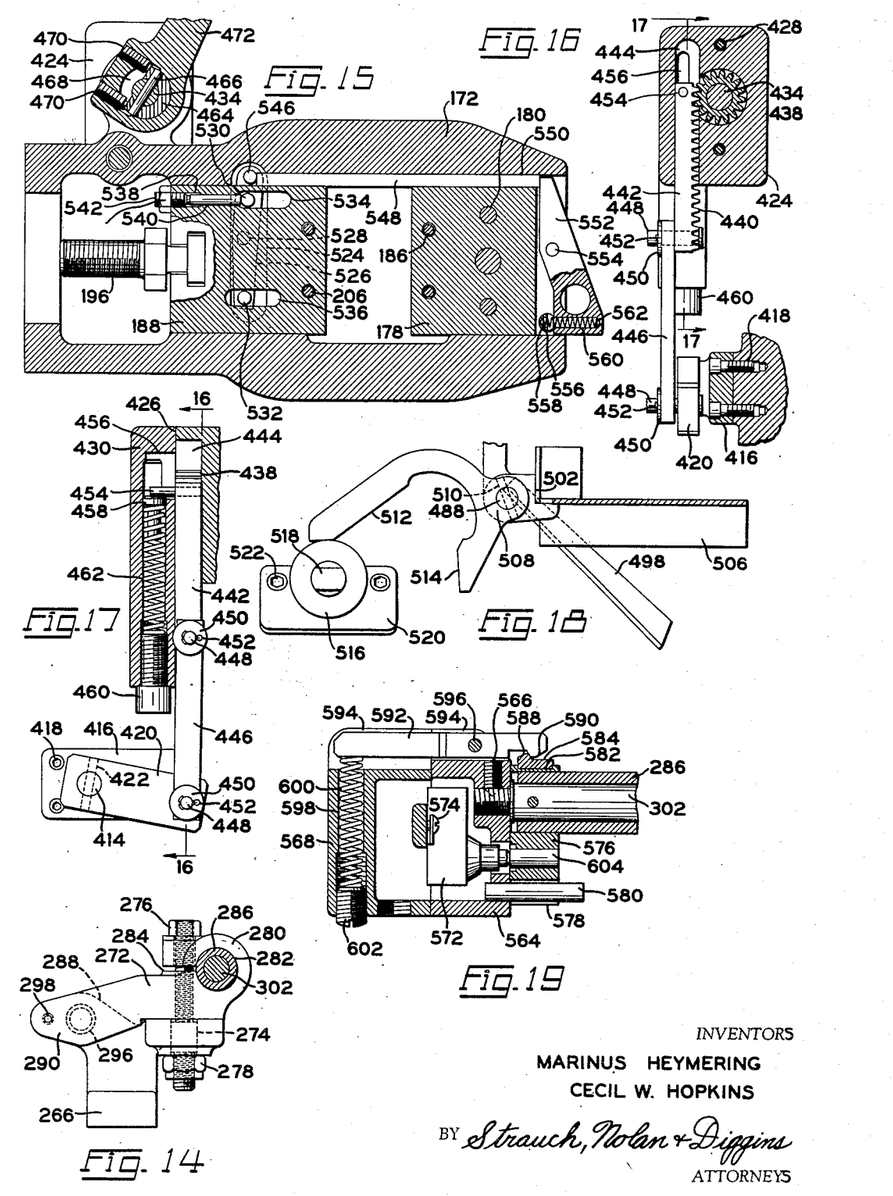
Figure 14 is an elevation, partially in section along line 14—14 of Figure 3.
Figure 15 is a vertical sectional view taken along line 15—15 of Figure 7.
Figure 16 is a vertical sectional view taken along line 16—16 of Figures 3 and 17.
Figure 17 is an elevational view of the parts shown in Figure 16 and partially in section along line 17—17 of that figure.
Figure 18 is a detail elevational view taken in the direction of the arrow in Figure 2A.
Figure 19 is a detail sectional view taken along line 19—19 of Figure 3.

Referring to Figures 3, 13 and 14, a support member 266 is secured by screws 268 on an external surface of the main cam housing 48 and is accurately positioned thereon by locating pins 270. Member 266 serves as a support for a bracket 272 which is retained thereon for pivotal movement in a horizontal plane, by means of a stud 274, nut 276 and lock nut 278. Bracket member 272 is provided with a boss 280 having a horizontal bore 282 and being split as at 284. A long bushing 286 is journalled through bore 282 and is retained therein in longitudinally adjusted position by the clamping action of stud 274 and nuts 276 and 278.

Arms 288 and 290 extend outwardly from support member 266 and bracket 272 into spaced opposed relation with each other. Opposed recesses 292 and 294 in arms 288 and 290, respectively, receive a compression spring 296 which tends to rock bracket 272 about the pivot stud 274 in the counterclockwise direction. Such rocking movement is adjustably limited by means of a screw 298 which passes through arm 288 and is threadedly engaged in arm 290 of bracket 272. A nut 300 threaded on screw 298 between the two arms, provides means for accurately adjusting the extreme counterclockwise position of bracket 272.

A rod 302 is journalled for longitudinal sliding movement in bushing 286 and extends forwardly thereof over the carriage 38 as shown in Figure 9. A rectangular block 304 is secured to the forward end of rod 302 by screw 306 and pin 308 (Figure 10). The forward end of block 304 is recessed at 310 to receive one end of a rod 312 which is retained in recess 310 by a pin 314. Spaced bushings 316 and 318 are mounted on rod 312. A nipple pilot 320 is journalled for sliding movement upon the rearward bushing 316 and is frictionally fitted upon the forward bushing 318 for unitary axial movement therewith. A spring 322 is also mounted on rod 312 between bushings 316 and 318 to retain bushing 316 against the forward surface of block 304 and to urge bushing 318 and nipple pilot 320 forwardly. A pin 324 is pressed transversely through the forward extremity of rod 312 and extends radially therefrom to limit the forward movement of nipple pilot 320.

A second block 326 is attached to the top surface of block 304 by a screw 328. Block 326 is provided with a longitudinal slot 330 in its bottom surface to retain a nipple locating finger 332 which is restrained against longitudinal movement by a key 334 imbedded in the top surface of block 304. A recess 336 is formed in block 326 to receive a spring 338, one end of which bears against the top surface of the nipple locating finger 332, urging that member downwardly.

As seen in Figures 3, 9 and 13, the rod 302 normally positions the nipple pilot 320 in alignment with the center of the space between gripping members 182 and 202 when said members are closed and in alignment with the axis of the partially finished nipple W which rests on the blades 168. The nipple pilot 320 is further provided with a beveled portion 340 on its forward end. Rearwardly of beveled portion 340, nipple pilot 320 is formed with a cylindrical portion 342 whose diameter is slightly less than that of the work piece being operated upon. Rearwardly of cylindrical portion 342, a shoulder 344 is provided on nipple pilot 320. A sharp V-shaped projection 346 capable of engaging the threads formed on work piece W is formed on the forward end of nipple locating finger 332.

The above-mentioned bracket 250, shown in Figures 3, 9 and 13 is formed with a horizontal slot 348. A flat, irregularly shaped bell crank 350 is disposed in slot 348 and is pivotally mounted on a pin 352 which is frictionally fitted in the top and bottom walls of slot 348. Within slot 348, a pin 354 is imbedded in bell crank 350 to attach thereto a roller 356. Bracket 250 is also provided with a recess 358 to receive a compression spring 360. A detent 362 is also inserted in recess 358 and engages, at one end, the roller 356. Thus the force of spring 360 is utilized to urge bell crank 350 to rock about its pivot 352 in the counterclockwise direction. Rotation of bell crank 350 in this direction is arrested, as shown in Figure 13, by the side wall of slot 348.

In the other arm of bell crank 350, an opening 364 is formed to permit the passage therethrough of a stud 366. One end of stud 366 is threaded to receive a pair of locknuts 368 and a compression spring 370 is mounted on stud 366 between locknuts 368 and the surface of crank 350 through which stud 366 passes. Thus force is applied to urge stud 366 to move axially out of opening 364. To the end of stud 366 which protrudes through the opposite side of the arm of crank 350, a swivel 372 is attached by means of a pin 374. A cam bar 376 is connected at one end to swivel 374 by a pin 378. Both cam bar 376 and crank 350 are provided with opposed semi-circular recesses 380 in which is disposed a knuckle pivot 382. Thus, cam bar 376 is, in effect, pivotally mounted with respect to crank 350 and is urged to rock in the clockwise direction, as shown in Figure 13, by the force of spring 370. Such rocking movement is adjustably limited by a set screw 384, threaded through the extended arm of crank 350 and contacting the extreme end of cam bar 376. A lock nut 386 holds set screw 384 in adjusted position.

A flat 388 is formed on rod 302 intermediate the ends thereof to provide a surface for mounting a cam plate 390 on rod 302 by means of a screw 392. Cam plate 390 is formed with integral side flanges 394 (Figure 9) which engage opposite sides of rod 302 to prevent rocking movement of cam plate 390. Cam plate 390 is longitudinally adjustable by reason of the fact that screw 392 passed through a slot 396 in said plate. A beveled surface 398 is formed on one forward corner of cam plate 390 for engagement by the free end of cam member 376 in the relative longitudinal movement of said cam member 376, which is secured to the carriage 38, and rod 302 which is longitudinally stationary with respect to the bed 30.

A mechanism for automatically ejecting the completed nipple from the second stage grips will now be described.

As shown in Figure 8, an ejector cam 400 is secured by a screw 402 and pins 404 to the lower arm 220 of cam bracket 216. A roller follower 406 rides on the upper surface of cam 400 and is attached by a nut 408 to one end of a lever 410. Lever 410 is secured by a pin 412 to one end of a shaft 414 for unitary rocking movement therewith. The previously described bracket 146 (Figure 5) provides a bearing for shaft 414 at one side of carriage 38. Shaft 414 extends therefrom transversely across the carriage (Figure 3) and through a bearing bracket 416 which is secured to the opposite side of carriage 38 by means of screws 418 (Figures 16 and 17). Another lever 420 is secured by pin 422 to the end of shaft 414 which protrudes outwardly from bracket 416.

A large upstanding boss 424 (Figures 2A, 3 and 7) is formed as an integral part of carriage front 172 and has a flat, rearwardly facing, vertical surface 426 on which is secured, by screws 428, a cover plate 430. A pair of bushings 432 are disposed in aligned bores in boss 424 and cover plate 430 to provide bearing for a shaft 434. Intermediate the ends of shaft 434, a pin 436 keys thereon a spur pinion 438 for which space is provided in the interior of boss 424 and cover plate 430 (Figure 7). Accordingly, pinion 438 is disposed in position to mesh with the teeth 440 of a vertically reciprocating rack 442 which is slidably retained in a suitable recess 444 in boss 424, by cover plate 430 (Figures 16 and 17).

The lower end of a rack 442 is connected to the forward end of lever 420 by a link 446 which is attached to both rack 442 and lever 420 by pins 448, washers 450 and cotter pins 452. A pin 454, imbedded in rack 442, extends rearwardly therefrom into a recess 456 in cover plate 430 where it is engaged by one end of an upwardly directed detent 458. The recess 456 is closed at the bottom by a cap screw 460. A compression spring 462 is disposed in recess 456 between screw 460 and detent 458 to urge the latter upwardly into contact with pin 454.

One end of the shaft 434 projects forwardly from boss 424 and on this projection a bushing 464 is secured by a pin 466 (Figures 7 and 16). Bushing 464 is formed with a transverse slot 468 to provide flat surfaces for engagement by a pair of set screws 470 which are threadedly engaged in one end of a lever 472, fitted over bushing 464. As shown, set screws 470 engage bushing 464 on opposite sides of the center thereof and effectively key lever 472 to bushing 464 and therefore to shaft 434 for unitary rotation therewith. At the same time, this construction provides a convenient means for adjusting the angular position of lever 472, relative to shaft 434, by advancing one of the set screws and withdrawing the other.

As best seen in Figure 2A, lever 472 has attached to its other end an ejector plate 474, a screw 476 and pins 478 being used for this purpose. Ejector plate 474 is formed with two camming surfaces 480 and 482 which are employed to dislodge the work piece W from either the stationary grip 182 or movable grip 202, after the threading operation is completed as will be explained later.

The carriage front 172 also has a boss 484 (Figure 2A) depending therefrom and having a bore 486, whose axis is inclined with respect to the horizontal. A shaft 488 is journalled for rocking movement in bore 486 and is retained axially therein by a collar 490 secured to said shaft at one end of bore 486 by a pin 492. A conventional retaining ring 494 may be mounted on shaft 488 at the other end of bore 486 to assist in maintaining the proper axial position of the shaft. The upper, inwardly extending portion of shaft 488 has a flat surface 496 formed thereon to provide a seat for a chute 498 which is secured to shaft 488 by a plurality of screws 500. It will be noted that chute 498 extends beneath the position in which the work W is threaded.

As seen in Figures 2A and 18, boss 484 is formed with an angular recess 502 in which is secured, by screws 504, a stationary chute 506 having its inner edge substantially contiguous to the movable chute 498 and extending outwardly over the side of the machine bed 30.

On the outwardly projecting extremity of shaft 488, a cam member 508 is secured by a pin 510 (Figure 18). Cam 508 is provided with the two camming surfaces 512 and 514 which are operated alternately in the reciprocation of carriage 38 by a roller 516 which is secured by a stud 518 to a bracket 520. Screws 522 are employed to attach bracket 520 to the side of bed 30.

The carriage front 172 has formed therein, rearwardly adjacent the movable vise jaw 188, a vertically elongated recess 524 (Figure 15). A lever 526 is pivotally mounted in recess 524 for rocking movement about pin 528 which is imbedded in carriage front 172, intermediate the ends of recess 524. Two other pins 530 and 532 are frictionally fitted in lever 526 and are disposed, respectively, above and below the pivot pin 528. The pins 530 and 532 protrude forwardly from lever 526 into horizontally elongated recesses 534 and 536, respectively, in the rear wall of movable vise jaw 188. A bore 538 is formed in vise jaw 188 to communicate with recess 534 and the outer side surface of the jaw. A plug 540 is retained in bore 538 by a set screw 542 which is threadedly engaged in the outer end of said bore and which also serves to adjust the axial position of the plug 540. A lock nut 544 maintains the set screw 542 in axially adjusted position.

A further pin 546 is frictionally fitted in the top end of lever 526 and extends forwardly therefrom to engage one end of a rectangular bar 548. A rectangular slot 550 (Figures 9 and 15) extends from recess 524 to the opposite side of carriage front 172 and above the vise jaws 178 and 188 to receive the bar 548. The other end of bar 548 is in contact with one end of a lever 552 which is pivotally mounted on carriage front 172 on a pin 554 imbedded in the carriage front. Another pin 556 is imbedded in carriage front 172 and extends forwardly therefrom adjacent to the lower end of lever 552. Both pin 556 and lever 552 are formed with opposed cylindrical recesses 558 and 560 respectively. A compression spring 562 is disposed in recesses 558 and 560 and urges lever 552 to rock in the counterclockwise direction about the pivot pin 554. The purpose of the mechanism described above is that of preventing operation of the machine when a work piece is improperly held in the grips, as will appear more fully below.

A safety mechanism, designed to prevent the operation of the machine when a work piece is incorrectly positioned to enter the threaded grips 182 and 202 at the rearward position of carriage 38, is shown in Figures 3 and 19. The rear end of rod 302 is threadedly engaged in one wall of a switch cover 564, a set screw 566 being provided to maintain this connection. A switch housing 568 is secured to the rear surface of the cover 564 by screws 570. In the interior of switch housing 568, a normally open limit switch 572 is mounted by means of screws 574. Forwardly of switch cover 564, a block 576 is journalled upon the bushing 286 and is formed with a recess 578 in one exterior surface. A pin 580 is frictionally fitted in the forward wall of cover 664 and extends forwardly into recess 578 in block 576 to prevent relative rotation between said block and cover 564.

In its top surface, block 576 has a rectangular groove 582 formed to receive the latch seat 584 which is retained in position by screw 586. The latch seat 584 is formed with a projection 588 which normally engages a similar projection 590 on a latch 592. Latch 592 is mounted in aligned grooves 594 in cover 564 by a pin 596. A bore 598 in housing 562 encloses a spring 600, held in compression between a set screw 602 and the rear end of the latch 592. Thus, spring 600 urges latch 502 to rock about its pivot 596 in the clockwise direction (Figure 19) to bring the projections 588 and 590 into latching engagement. A pin 604 is frictionally fitted through the block 576 and normally, when latching engagement exists between projections 588 and 590, depresses the button of switch 572 to maintain a closed circuit therethrough.

Operation

The synchronous advance and withdrawal of the carriages, the opening and closing of the grips and movement of the transfer mechanism may all be accomplished in the manner shown and described in the above-mentioned patent to Smith and need not be repeated here.

As the transfer mechanism 40 reaches the proper position to engage a work piece which has been partially threaded in the first stage of the machine, the stationary stop 158 strikes the rod 156 of latch member 132 (Figure 2B), causing the latter to rotate in the clockwise direction (as seen in Figure 6). This disengages the latch surface 152 from the co-acting surface 154 gripping lever 108 and the gripping lever, under the pressure of spring 124, rocks about its pivot 110 into closed position, seizing the partially completed work piece, as shown in the dotted line position in Figure 2b.

Thereupon, the shaft 91 is rotated to swing the transfer arm 98 and the gripping members and work carried thereby about the axis of shaft 91, meanwhile rotating transfer arm 98 about its own axis, thus reversing the work piece end from end and carrying it to the second work forming stage to the position shown in Figure 5. Here, it will be seen, the stud 148 has engaged the gripping lever to rock it in the clockwise direction against the pressure of spring 124 and causes it to be latched in open position by the latch members 132 (Figure 6). The work piece is thus deposited on the work supporting blades 168 with its unthreaded end facing the die head 44 (Figure 9). At this time, the carriage 38 is in its forward position and, if a previous work piece is present it is being threaded, as shown.

At the conclusion of the threading operation, the die head 44 is opened automatically, by conventional means not shown, and the carriage is moved rearwardly. It will be seen that, in the rearward movement of carriage 38, the work piece will be carried onto the pilot 320 so that the bore of the work piece will fit upon the cylindrical surface 342 of the pilot 320. Continued rearward movement of carriage 38 causes the forward end of the work piece to be engaged by the pin 264 in the end of the work locating lever 254. This pin 264 urges the work piece against the shoulder 344 on the pilot 320 and then carries the work piece and the pilot together rearwardly against the pressure of spring 322 until a groove of the previously formed thread, at a predetermined distance from the end of the work piece, is engaged by a sharp point 346 on work locating finger 332. As explained above, the finger 332 is resiliently mounted so that it will slide over the threads of the work piece until the desired groove is reached.

Work locating finger 332 is longitudinally stationary with respect to the bed of the machine, so that any thread of a work piece engaged by it is in exactly the same position as was the thread of the preceding work piece. No particular groove of the thread need be engaged by the finger 332, it being merely necessary to hold the work piece W far enough from the end to prevent its wobbling on the pilot 320. As this desired point is reached, the roller follower 238 (Figure 8) rides down the inclined surface 224 of locating cam 222, rocking lever 242 in the counterclockwise direction. This motion is transmitted through shaft 246 to the lever 254 to lift the pin 264 out of engagement with the forward end of the work piece, leaving the latter held by finger 332 on pilot 320. The particular thread on the work piece engaged by finger 332 is thus determined by the point at which pin 264 is disengaged from the work piece. It will now be evident that the function of the above-described angular adjustability of the lever 254 relative to shaft 246 is that of causing pin 264 to lose contact with the work piece at the proper moment.

Prior to the operation of the machine, the point 346 must be positioned in exact registry with one of the teeth of the threaded grips 182 and 202, when the carriage is stopped at the rearward limit of its travel in position to grip a work piece. This may be done by loosening nut 276 (Figure 14) and adjusting sleeve 286 and all the parts supported thereby longitudinally until the required position of point 346 is obtained, after which the sleeve 286 is reclamped. Since point 346 is always in register with the tooth of the grips 182 and 202, it follows that the groove of work piece engaged by point 346 is also always in exact position to be properly engaged by the grips.

It will be noted, from Figure 8 that, when carriage 38 is in forward or threading position, roller 238 is entirely clear of cam 222. Without additional restraint, therefore, the weight of lever 254 would cause it to fall (Figure 9) onto the work holding blades 168. The position shown in Figure 8 represents the limit of movement of lever 254 in the clockwise direction, this limit being determined by a pin 606 (Figures 8 and 9) imbedded in lever 242 and projecting therefrom to engage a lug 608 formed integrally with the boss 248.

As the carriage 38, in its rearward travel, approaches its rearmost or loading position (shown in Figure 13), the forward end of cam 376 comes into contact with the inclined surface 398 of block 390 fixed on rod 302. This causes the rod 302, in bracket 272, to be rocked about the pivot 274 into the position shown in dotted lines in Figure 13. Thus the work piece is enabled to avoid interfering with the stationary grip 182 as the carriage 38 moves rearwardly to bring the threaded grips into register with the thread of the work piece. It is to be noted, however, that the lateral displacement of the rod 302 is not effected until the work piece is positioned in pilot 320 by lever 254. When the carriage arrives at its rearmost position, the cam 376 moves off the square rearward end of the block 390 and rod 302, under the pressure of spring 296, returns to the solid line position of Figure 13. In this manner, the work piece, which, as explained above, is now in exact alignment for engagement by the grips, is brought into engagement with the threads of the stationary grip 182, after which the moving grip is automatically closed by operation of the cylinder 190.

If the machine should be improperly set up so that the carriage 38 reaches its rearmost position before cam 376 has moved off the side surface of plate 390, the closing of grip 202 will force rod 302 into the solid line position of Figure 13. This may be accomplished without damage to the mechanism since the cam 376 merely rocks about its pivot 382, compressing spring 370. It should be noted that spring 370 must be strong enough to cause cam 376 to rock rod 302 against the force of spring 296.

The carriage 38 is now moved forward toward the die head 44 and the remaining blank end of the work piece is threaded while it is held against rotation by grips 182 and 202. After the threading operation has been concluded, the grips are opened and the carriage is again moved rearwardly. The finished work piece, which has been held very tightly in the grips, usually does not drop out. The ejector mechanism therefore has been provided to positively remove it. As the carriage 38 withdraws, the roller 406 (Figure 8) rides downwardly on the cam 400, rocking lever 410 counterclockwise. This motion is transmitted through shaft 414 to rock lever 420 (Figure 17) in the same direction. This causes the connecting link 446 to push rack 442 upwardly and to rotate pinion 438 (Figure 16) in the clockwise direction. Rotation of pinion 438 causes lever 472 and plate 476 to be rotated in the same direction. Thus either of the surfaces 480 and 482 of plate 456 contacts the finished work piece and removes it from the stationary grip 182 or the moving grip 202. The surfaces 480 and 482 should be so formed as to remove the work piece by a camming action and not be a direct blow which would damage the newly finished threads.

When the finished work piece is removed from the grips, it drops upon a chute comprising the sections 498 and 506 so that it rolls out of the machine under the influence of gravity. The upper chute section 498 is made automatically movable so that it is in position to receive a work piece discharged by the plate 474, but is out of the way of the die head for the threading operation. Thus, as the carriage 38 moves forwardly, the cam 508, moving with the carriage, is rocked in the clockwise direction (Figure 18) by reason of the contact of the stationary roller 516 with the cam surface 512. Since cam 508 and chute section 498 are keyed to the same shaft, chute section 498 is also rotated about the axis of shaft 488 from the position shown in Figure 2A to that shown in Figure 18 to provide space for the carriage to approach the die head.

On the return travel of carriage 38, roller 516 engages cam surface 514 to effect a relatively quick return movement of chute section 498 to the position as shown in Figure 2A before the work piece is discharged.

The present invention also comprises a safety mechanism to prevent the initiation of a threading operation if a work piece is improperly gripped. In figures 2B, 3 and 8 a switch 610, which is connected in the main power line to the machine motor, is shown attached to the stationary bracket 92 in position to be operated by the projecting lever 552 (Figures 2A, 3 and 15) on carriage front 172 in its passage to and from the threading position. Thus, contact between lever 552 and switch 610 would cause the machine to stop. In the normal operation of the machine, lever 552 is rocked to cause it to pass switch 610 without touching it.

When the sliding vise jaw 188 (Figure 15) moves inwardly to its normal closed position, the plug 540 engages pin 530 causing lever 526 to rock about its pivot 528. Consequently pin 546 forces bar 548 to the right as shown in the drawing to rock lever 552 about its pivot 554. The projecting end of lever 552 is thus rocked inwardly to avoid striking switch 610 during the forward travel of the carriage 38. On the return travel of carriage 38, vise jaw 188 is withdrawn outwardly. In this position, the inner wall of slot 536 engages pin 532 to rock lever 526 for the same result. It is consequently apparent that failure of vise jaw 188 to open or close to the normal position would result in failure to withdraw lever 552, switch 610 would be contacted thereby, and the machine would cease operating.

The safety switch 572, which is also connected in the main power line to the machine motor, is opened to stop the operation of the machine when the switch cover 564 and the attached parts are forced rearwardly to break contact between latching elements 588 and 590 and between latching the button of switch 572. This occurs when any unusual stress is placed on rod 302 as the carriage 38 moves rearwardly. Such excessive stress may occur, for instance, when a work piece is improperly aligned on pilot member 320 and tries to enter the space between the grips in an angular position. The above described operation of this safety device eliminates such possibilities.

It will be apparent from the foregoing that the present invention provides a rugged, highly efficient and relatively simple machine capable of the automatic high speed production of close and short nipples heretofore produced by one or more skilled operators.

It has been found that two of the above described machines require the attention of the single semi-skilled mechanic. Since the production rate of one of the present machines is at least equal to the production rate achieved by a skilled operator using prior machines, it is apparent that the production per worker can at least be doubled through the use of the present machine. Further economies are effected since the machine permits the utilization of workers having a lower degree of skill while maintaining the quality of the finished product.

It is also an important feature of the invention that existing machines, for example, machines of the type disclosed in the above mentioned Smith patent can readily be modified to incorporate the apparatus of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a metal working machine having means including a first thread cutter for threading one end of a work piece: means for automatically threading the opposite end of said work piece comprising: an axially fixed rotatable second thread cutter; means for positioning said work piece adjacent said second thread cutter; a work pilot; means for transferring said work piece to said pilot; means for positively locating the threads on said work piece in a predetermined position with respect to said pilot; axially movable threaded grips, means for automatically positioning the threads of said grips in registering clamping relation with the threads of said work piece at said predetermined position on said pilot; and means for moving said grips to dispose the blank end of said work piece in cutting relation with said second cutter to form threads on said blank end of said work piece.

2. The mechanism of claim 1 together with means for automatically ejecting the work piece from said threaded grips after completion of the threading operation in said second cutter.

3. The mechanism of claim 2 with a work chute movable into and out of operating position, and means operable in timed relation with said ejector for disposing said chute under said grips when said work piece is ejected from said grips.

4. In a metal forming machine having a frame, first and second axially fixed rotatable thread cutters and a reciprocal carriage mounted thereon, and means for delivering a work piece to said first cutter and removing a partially threaded work piece therefrom: means for automatically threading another portion of said work piece comprising; a work rest mounted on said carriage; means for positioning said work piece on said work rest with its blank end disposed toward said second thread cutter; a pilot mounted on said frame; means on and movable with said carriage for transferring said work piece from said work rest to said pilot; means associated with said pilot for positively locating the threads of said work piece in a predetermined position on said pilot; a pair of threaded grips mounted on and movable with said carriage between positions opposite said pilot and said second thread cutter; and means for actuating said grips to dispose the threads thereof in registering clamping relation with the threads of said work piece at said predetermined position on said pilot whereby said work piece is carried in the subsequent movement of said grips to said second thread cutter for cutting a second series of threads thereon.

5. The mechanism of claim 4 together with a cam on said frame and means on said carriage operable by said cam for ejecting the finally formed work piece from said threaded grips.

6. The mechanism of claim 5 together with a second cam on said frame; a work delivering chute on said carriage movable into and out of work receiving position; and means operable by said second cam for disposing said chute in work receiving position under said threaded grips when a work piece is ejected by said ejecting means.

7. In a machine having means for threading one end of a work piece at a first work station and a thread cutter at a second work station: means for automatically threading the opposite end of said work piece at said second work station comprising; a work rest adjacent said thread cutter; means for transferring said work piece to said work rest with its blank end facing said thread cutter; a normally fixed work pilot; means to transfer said work piece to said pilot; means for positively locating the threads of said work piece in a predetermined position on said pilot; a pair of threaded grips; and means to actuate said grips to dispose the threads thereof in registering clamping relation with the threads on said work piece at said predetermined position and thereafter move said grips to dispose the blank end of said work piece in cutting relation with said thread cutter to thread said blank end of said work piece.

8. The mechanism of claim 7 together with means operable in timed relation with the movement of said grips for ejecting said work piece from said grips upon completion of the second threading operation.

9. In a machine having means for threading one end of a work piece at a first work station and a thread cutter at a second work station; means for automatically threading the opposite end of said work piece at said second work station comprising; a work rest adjacent said thread cutter; means to transfer said work piece to said work rest with its blank end facing said thread cutter; a normally fixed work pilot including a member adapted to fit within said work piece; means to transfer said work piece to said pilot; a locating finger on said pilot adapted to engage one of the threads of said work piece to locate said threads in a predetermined position on said member; a pair of threaded grips; and means to actuate said grips to dispose the threads thereof in registering clamping relation with the threads on said work piece at said predetermined position and thereafter move said grips to dispose the blank end of said work piece in cutting relation with said thread cutter to thread said blank end of said work piece.

10. Mechanism for threading the blank portion of a partially threaded work piece comprising; a thread cutter; a pilot in axial alignment with said thread cutter; means for positioning a work piece on said pilot with its blank end disposed toward said cutter; means on said pilot for positively locating the threads of said work piece in a predetermined position with respect to said cutter; a pair of threaded grips; means for actuating said grips to dispose the threads thereof in registering clamping relation with the threads of said work piece at said position and thereafter move said grips to dispose the blank end of said work piece in cutting relation with said cutter.

11. A metal working machine comprising, in combination; a stationary frame; an axially fixed rotatable thread cutter mounted on said frame; a carriage mounted on said frame for reciprocation to and from said thread cutter; a work pilot pivotally mounted on said frame normally in axial alignment with said thread cutter; a pair of threaded grips mounted on said carriage for movement between said pilot and said thread cutter; means for positioning a partially threaded work piece on said work pilot with the threads of said work piece in a predetermined position on said pilot; means for moving said carriage to dispose the threads of said grips opposite a threaded portion of said work piece; coacting means on said pilot and said carriage for pivoting said pilot to permit said movement of said grips; means for closing said grips on said work piece with the threads of said grips in registering clamping relation with the threads of said work piece; and means for moving said carriage and said grips carrying said work piece to dispose the work piece in cutting relation with said cutter whereby threads are cut on an unthreaded portion of said work piece.

12. The mechanism of claim 11 together with means mounted on said carriage and actuated by the movement thereof for forcing the work piece out of said grips after said work piece is threaded in said cutter.

13. Mechanism for threading the blank portion of a partially threaded work piece comprising; a thread cutter; a work rest adjacent said cutter; means for positioning said work piece on said work rest with its blank end toward said cutter; a pilot normally in axial alignment with said thread cutter and said work rest; a work locating lever; means for actuating said lever to transfer said work piece from said work rest onto said pilot; means on said pilot engageable with the threads of said work piece for positively locating said threads of said work piece with respect to said pilot; a pair of threaded grips movable between said pilot and said cutter; and means to dispose the threads of said grips in registering clamping relation with the threads of said work piece and thereafter move said grips carrying said work piece into cutting relation with said cutter.

14. In a metal forming machine having a frame, first and second axially fixed rotatable thread cutters and a reciprocal carriage mounted thereon, and means for delivering a work piece to said first cutter and removing a partially threaded work piece therefrom; means for automatically threading another portion of said work piece comprising; a work rest mounted on said carriage; means for positioning said work piece on said work rest with its blank end disposed toward said second thread cutter; a pilot mounted in said frame for pivotal movement into and out of axial alignment with said second thread cutter; means on said carriage for transferring said work piece from said work rest to said pilot; means on said pilot engageable with a thread on said work piece for positively positioning said work piece on said pilot; a pair of threaded grips axially aligned with said second thread cutter, mounted on and movable with said carriage between positions opposite said pilot and said second thread cutter; means for moving said grips to dispose the threads thereof in registering clamping relation with the threads of said work piece on said pilot; means on said carriage for pivoting said pilot to permit said movement of said grips; and means to thereafter move said grips carrying said work piece to said second thread cutter for cutting a second series of threads thereon.

15. The machine of claim 14 together with a cam on said frame and means on said carriage operable by said cam for ejecting the finally formed work piece from said threaded grips.

16. The machine of claim 15 together with a second cam on said frame; a work delivering chute on said carriage movable into and out of work receiving position; and means operable by said second cam for disposing said chute in work receiving position under said threaded grips when a work piece is ejected by said ejecting means.

17. The machine of claim 14 wherein said transfer means comprises a cam on said frame and a lever on said carriage operable by said cam for movement into and out of engagement with said work piece.

18. Mechanism for threading the blank portion of a partially threaded work piece comprising; a thread cutter; a work rest adjacent said cutter; means for positioning said work piece on said work rest with its blank end toward said cutter; a pilot normally in axial alignment with said thread cutter and said work rest, means mounting said pilot for limited axial movement to and away from said cutter; means yieldingly urging said pilot toward said cutter; a work locating member; means for actuating said member to transfer said work piece from said work rest onto said pilot; relatively fixed means for positively locating the threads of said work piece in a predetermined position with respect to said pilot and said cutter; a pair of threaded grips movable between said pilot and said cutter; and means to dispose the threads of said grips in registering clamping relation with the threads of said work piece and thereafter move said grips carrying said work piece into cutting relation with said cutter.

19. Mechanism for threading the blank portion of a partially threaded work piece comprising; a thread cutter; a work rest adjacent said cutter; means for positioning said work piece on said work rest with its blank end toward said cutter; a pilot normally in axial alignment with said thread cutter and said work rest; means mounting said pilot for limited axial movement to and away from said cutter; means yieldingly urging said pilot toward said cutter; a work locating member; means for actuating said member to transfer said work piece from said work rest onto said pilot; means for locating the threads of said work piece at a predetermined position on said pilot; a pair of threaded grips movable between said pilot and said cutter; one of said grips being laterally stationary; means for moving said grips to dispose the threads of said grips in registering clamping relation with the threads of said work piece; means for pivoting said pilot out of alignment with said stationary grip to permit said movement of said grips; and means for moving said grips carrying the work piece to dispose the work piece in cutting relation with said cutter whereby threads are cut in the unthreaded portion of said work piece.

References Cited in the file of this patent

UNITED STATES PATENTS

| | | |
|---|---|---|
| 1,484,662 | Morrison | Feb. 26, 1924 |
| 2,289,850 | Matter | July 14, 1942 |
| 2,360,906 | Smith | Oct. 24, 1944 |